United States Patent
Kostlin et al.

[11] 3,949,259
[45] Apr. 6, 1976

[54] LIGHT-TRANSMITTING, THERMAL-RADIATION REFLECTING FILTER

[75] Inventors: Heiner Kostlin, Brand; Rüdiger Jost, Aachen-Kornelimunster, both of Germany

[73] Assignee: U.S. Philips Corporation, New York, N.Y.

[22] Filed: Aug. 9, 1974

[21] Appl. No.: 496,143

[30] Foreign Application Priority Data
Aug. 17, 1973 Germany............................ 2341647

[52] U.S. Cl. ..................... 313/112; 350/1; 427/166; 427/168; 427/343; 427/377; 428/432
[51] Int. Cl.² ...................... H01J 61/40; H01K 1/26
[58] Field of Search ........... 117/33.3, 124 B, 124 A; 350/1, 288, 311; 313/112; 427/165, 166, 168, 337, 343, 377; 428/432, 410

[56] References Cited
UNITED STATES PATENTS
3,400,288  9/1968  Groth.................................. 117/33.3
3,666,534  5/1972  Groth et al. ........................ 117/33.3

OTHER PUBLICATIONS
Groth et al., K "Philips Tech. Rev." V26 (1965), pp. 105–111.

Vossen, "RCA Review" Vol. 32 (June 1971), pp. 289–296.

Fraser et al., "J. Electrochem. Soc." Vol. 119 (Oct. 1972), pp. 1368–1374.

Primary Examiner—John H. Newsome
Attorney, Agent, or Firm—Frank R. Trifari; Simon L. Cohen

[57] ABSTRACT

A light-transmitting, thermal-radiation reflecting filter which comprises a transparent support coated with indium oxide which is doped with more than 7 atomic percent of tin, calculated with respect to the number of indium atoms, has a free-electron density between $10^{21}$ and 3 times $10^{21}$ per cm³ and a plasma wavelength of less than 1.2μm. The filter can be manufactured so as to have a stress-free support by heating a support, which is coated in known manner with tin-doped indium oxide, at a temperature between 300°C and the softening temperature of the support material in a gas having an oxygen partial pressure of less than $10^{-7}$ atmosphere.

11 Claims, 1 Drawing Figure

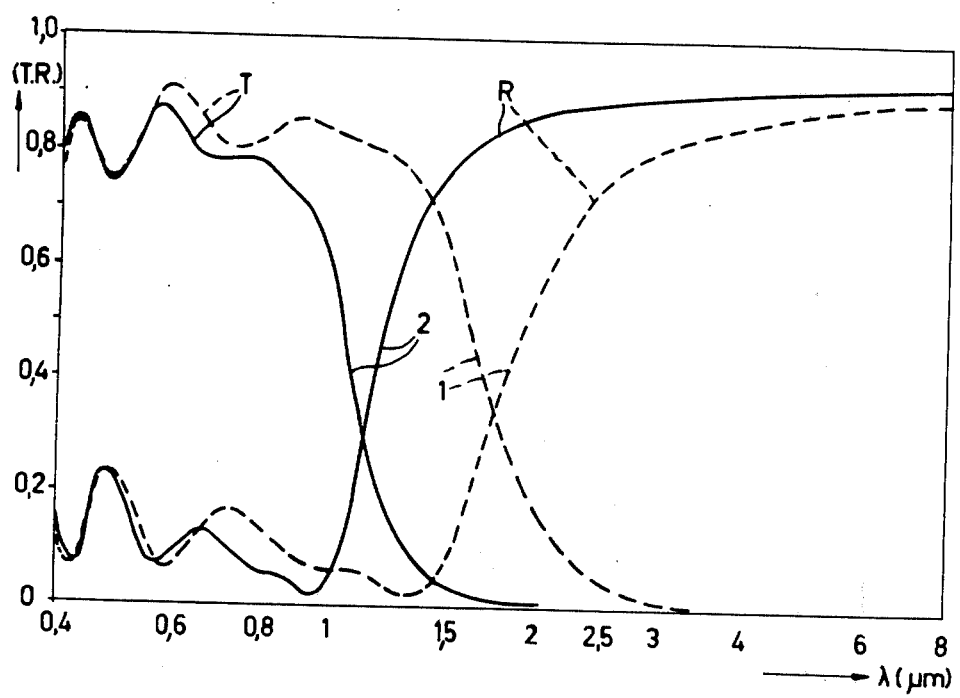

LIGHT-TRANSMITTING, THERMAL-RADIATION REFLECTING FILTER

The invention relates to a filter which transmits light and reflects thermal radiation and comprises a transparent support coated with a tin-doped indium oxide.

Such a filter may be referred to as a plasma edge filter as distinct from an interference filter or an absorption edge filter, because its properties are based on free electrons capable of performing plasma oscillations in solids. Because of these oscillations the material behaves as a metal with respect to electromagnetic radiation having a wavelength which exceeds what is generally referred to as the plasma wavelength $\lambda_p$ of the material, but as a dielectric with respect to radiation of a wavelength smaller than $\lambda_p$. For radiation from the former part of the spectrum ($\lambda > \lambda_p$) the material is impermeable and highly reflecting, whereas for radiation from the latter part of the specturm ($\lambda$spectrum $\lambda_p$) it is highly transparent. In the case of tin-doped indium oxide the normal band absorption begins only in the near ultra-violet.

The spectral position of this comparatively abrupt transition in the optical properties of the material, which is referred to as the plasma edge, is determined by the free-electron density. For the plasma wavelength we have the relationship:

$$\lambda_p = AN_e{}^{-\frac{1}{2}}$$

where A is a material constant, which is 4.0 for indium-oxide, and $N_e$ is the free-electron density expressed in $10^{20}$ per cm$^3$.

A filter of the abovementioned type is describied in U.S. Pat. No. 3,400,288, issued Sept. 3, 1968. The filter described in said Patent contains at most 5.5 atomic per cent of tin relative to the number of indium atoms and has a maximum free-electron density of 6.5 times $10^{20}$ per cm$^3$. Although the said Patent shows that in order to obtain a high reflectivity for thermal radiation the free-electron density must be a maximum and exceed $10^{20}$ per cm$^3$, it also shows that at a doping of about 2.3 atomic per cent of tin, saturation and a maximum of conductivity occur.

The known filter is obtained by atomizing a solution of indium chloride and stannic chloride in n butyl-acetate onto a hot glass plate. The temperature of the glass plate lies between 400°C and the softening temperature of the glass.

German Pat. No. 1,955,434 laid open to public inspection describes the same filter. After the tin-doped indium oxide layer has been formed on the hot glass plate, the filter must be cooled rapidly to prevent a reduction of the free-electron density. However, such rapid cooling introduces stresses in the support material. According to the said application a filter having the same free-electron density and hence the same optical properties but not subject to stresses in the support material is obtainable by heating the filter for a given time at a temperature between 300°C and the softening point of the support in a gas which contains from $10^{-2}$ to $10^{-4}$ volume per cent of oxygen.

It was found that the plasma wavelength of the known filter exceeds 1.6 $\mu$m.

It is an object of the present invention to provide a filter which transmits visible radiation but reflects thermal radiation beyond a comparatively short wavelength.

For this purpose, according to the invention a filter of the abovedescribed type is characterized in that the indium oxide contains more than 7 atomic per cent of tin calculated with respect to the number of indium atoms, has a free-electron density between $10^{21}$ and 3 times $10^{21}$ per cm$^3$ and a plasma wavelength of less than 1.2 $\mu$m.

A filter according to the invention preferably contains from 7 to 20 atomic per cent of tin.

Examples of suitable substrate materials are glass and quartz.

It was further found that the support of the filter according to the invention can be made free from stress by heating the filter at a temperature between 300°C and the softening point of the support in a gas having a partial pressure of oxygen of less than $10^{-7}$ atmosphere.

Accordingly the invention also relates to a method of manufacturing a light-transmitting, thermal-radiation reflecting filter in which a light-transmitting support is coated in known manner with tin-doped indium oxide and is heated at a temperature between 300°C and the softening temperature of the support in a gas containing a small amount of oxygen, wherein in order to obtain a heat filter having a plasma wavelength of less than 1.2 $\mu$m and a free-electron density between $10^{21}$ and 3 times $10^{21}$ per cm$^3$ the support, which is coated with indium oxide doped with tin in an amount of more than 7 atomic per cent calculated with respect to the number of indium atoms, is heated in a gas having a partial pressure of oxygen of less than $10^{-7}$ atmosphere.

CO, $H_2$ or CO and $H_2$ may be added to the gas to a partial pressure of 100 torr per component. The gas preferably contains CO, $H_2$ or CO and $H_2$ at a partial pressure of from 5 to 50 torr per component.

In a preferred embodiment of the method according to the invention the coated support is heated in a gas the oxygen partial pressure of which lies between $10^{-7}$ atmosphere and the equilibrium pressure of indium-oxide. In this case the gas preferably contains a mixture of CO and $CO_2$ or of $H_2$ and $H_2O$. A mixture of equal parts of CO and $CO_2$ or of $H_2$ and $H_2O$ at 1 atmosphere, for example, has an oxygen partial pressure which exceeds the equilibrium pressure of indium oxide by a factor of 10.

In practive, however, the gas may be CO, $H_2$ and CO and $H_2$ without any addition of $CO_2$ and/or $H_2O$. The process is stopped at the instant at which optimum reduction, i.e. maximum free-electron density, is reached.

The temperature of the gas preferably lies between 380°C and 500°C. The duration of the treatment may vary from a few seconds to a few minutes, depending upon the rate at which oxygen is given off to the gas. At temperatures below 300°C the process is very slow, whereas at 450°C it takes only a few minutes.

If required an inert gas, such as for example argon or nitrogen, may be added to the gas in which the filter is heated, the addition being, for example, such that the gas mixture is at atmospheric pressure.

The thickness of the layer of tin-doped indium oxide may vary between wide limits. One of the factors which determine these limits is the purpose for which the filter is to be used. When the thickness is considerable, visible light is absorbed; when the thickness is slight the filter will be too permeable to thermal radiation of long wavelength. As a rule the thickness of the layer will be selected so that the filter has a transmission of 50% at the plasma wavelength. Thus in the case of a plasma wavelength $\lambda_p$ of 1 $\mu$m the thickness of the layer is made about 0.23 $\mu$m. If $\lambda_p$ exceeds 1 $\mu$m, comparable results are obtained if the filter layer is 0.23 times $\sqrt{\lambda_p}$ $\mu$m thick. Optimum thickness values lie between 0.2 $\mu$m and 0.4 $\mu$m, although — depending upon the use of the filter — for some applications the thickness is made between 0.3 $\mu$m and 0.45 $\mu$m, for example for use in a filament lamp.

The support may be coated with a layer of tin-doped indium oxide in a known manner by known means. For example, a solution of a tin salt and indium salt may be sprayed by means of air or oxygen onto a substrate heated at a temperature between 400°C and the softening point of the substrate material. For this purpose known salts of indium and tin, such as halides, in particular $InCl_3$ and $SnCl_4$, nitrate, acetyl acetonate, salts of organic acids, such as acetate, palmitate, stearate and benzoate, dissolved in solvents known for such a purpose, such as lower alcohols, for example butanol, esters, for example butylacetate, and hydrocarbons, for example toluene and benzene, may be used.

The filter according to the invention may be used to screen an object illuminated by a source of light from the thermal radiation emitted by this source. The filter may also be used to increase the efficiency of a light source by reflecting the thermal radiation to the source. The filter is very suitable for use in a low-pressure sodium vapour discharge lamp. For this purpose it is applied to the inner wall of the outer envelope which serves as a substrate.

Embodiments of the invention will now be described, by way of example, with reference to the accompanying drawing, the single Figure of which is a graph showing the transmittance and reflectance spectra of two $In_2O_3$:Sn layer of equal thickness (0.3 $\mu$m) coated on hard glass.

The filter 1 was manufactured in known manner as described in U.S. Pat. No. 3,400,288. The layer of indium oxide was doped with 3 atomic per cent of tin, calculated with respect to the amount of indium. The concentration of charge carriers was $5.4$ times $10^{20}$ per cm$^3$. The heat filter 1 has a plasma wavelength of 1.7 $\mu$m.

The filter 2 was made in the following manner:

EXAMPLE 1

4 cm$^3$ of $SnCl_4$ were added to a solution of 100 gr of $InCl_3$ in 1 liter of acetic acid n-butyl ester. The solution was atomized with oxygen in an atomizing nozzle and the resulting aerosol was sprayed onto a plane glass substrate. The glass support had been placed on a hot plate and had a temperature of about 500°C.

The aerosol jet was swept over the substrate until the layer and the desired thickness of, for example, 0.3 $\mu$m, which is detectable by the interference color. The built-in doping was 7.1 atomic per cent of Sn/In. The coated support was then heated at 450°C in a container which initially was evacuated to a pressure of less than $10^{-4}$ torr, after which CO was introduced to a pressure of 15 torr. After 30 minutes the container was again evacuated and cooled.

The resulting heat filter has a layer of indium oxide with a concentration of charge carriers of 1.3 times $10^{21}$ per cm$^3$. The plasma wavelength of this heat filter is about 1.1 $\mu$m.

The two filters are largely transparent in the visible region of the spectrum and highly reflective in the infrared region. In contradistinction to the filter 1, however, in the filter 2 according to the invention the change from transparency to reflection commences at considerably shorter wavelengths. Furthermore the filter 2 has a markedly higher reflectivity at long wavelengths.

EXAMPLE 2

A process similar to that described in Example 1 was carried out, with the difference that $H_2$ was used for reduction. The filter was indistinguishable from that made by the method described in Example 2.

EXAMPLE 3

A process as described in Example 2 was carried out, with a difference that an increased amount of 8 cm$^3$ of $SnCl_4$ was added. Compared with Example 1 the concentration of free electrons was slightly increased to 1.4 times $10^{21}$ per cm$^3$. The plasma wavelength is about 1.07 $\mu$m.

EXAMPLE 4

20 cm$^3$ of a solution as described in Example 1 were atomised onto the front glass lens of a reflector filament lamp by means of an atomizing nozzle and a guide tube. The glass lens was disposed so that the surface which in the finished lamp faces the filament is coated. The glass lens was heated at 500°C by means of a radiating furnace arranged behind it. The thickness of the layer was chosen in the range between 0.3 $\mu$m and 0.4 $\mu$m. The coated glass lens was sealed to the remainder of the lamp. The lamp bulb than was evacuated to a pressure of less than $10^{-5}$ torr, the front lens was heated to a temperature between 450°C and 460°C, care being taken to ensure that the reflector part of the lamp is not heated to a temperature higher than about 150°C, after which the bulb was flushed with CO at a pressure of 15 torr. After 5 minutes the bulb was again evacuated and cooled. The finished lamp had about the same luminous intensity (visible radiation) in the focal range as an uncoated lamp (from 85% to 90%), but the overall heat radiation load imposed on an illuminated object was reduced to 25% or even less.

Heat filters manufactured by the method according to the invention may be used for the following purposes:

1. In a filament lamp the larger part of the radiation of which is thermal radiation in the wavelength range around 1.5 $\mu$m the heat filter can screeen an illuminated object from more than three quarters of the heat radiation. By contrast, the known filters described in U.S. Pat. No. 3,400,288 and German Patent No. 1,955,434 laid open to public Inspection can reduce the heat radiation to which the illuminated object is subjected by less than one quarter only.

1.1 The filter may be used as a discrete optical component, for example as a plane disk coated with $In_2O_3$:Sn for insertion between a cinematographic film or a transparency and the lamp in a projector.

1.2 As mentioned hereinbefore, the filter may form part of a lamp, for example as a coating on the front glass lens of a reflector lamp.

2. The filter reflects more than 80% of thermal radiation of wavelength beyond about 1.5 $\mu$m and hence may be used as a transparent heat-insulation system.

2.1 The filter may be used in a Dewar flask instead of the silvering, resulting in a transparent Dewar flask.

2.2 The filter enables the heat insulation and hence the efficiency of a low-pressure sodium-vapour discharge lamp to be improved. At a wavelength of 6 $\mu$m the maximum of the thermal radiation of the discharge vessel, the reflectivity R of the filter is 91.5% as compared to 89.5% in a filter according to the abovementioned U.S. Pat. No. 3,400,288. Thus the heat loss due to radiation (1-R) is reduced by at least 20% by the use of the heat filter manufactured by the method according to the invention.

EXAMPLE 5

8 cm$^3$ of SnCl$_4$ were added to a solution of 100 g of InCl$_3$ in 1 liter of butyl acetate. The soultion was atomized by means of oxygen onto a glass plate of 10 mm by 20 mm heated at a temperature of 500°C until a layer of 0.3 $\mu$m thick had been formed. The glass plate was placed in a container and heated at 450°C for 30 minutes while a gas stream of equal parts of CO and CO$_2$ at an overall pressure of 1 atmosphere was passed through at a rate of 1 liter per minute, The free-electron density of the filter was 1.4 times 10$^{21}$ per cm$^3$, and the plasma wavelength was 1.07 $\mu$m.

What is claimed is:

1. In a light-transmitting, thermal-radiation reflecting filter of the type comprising a light-transmitting support which is coated with tin-doped indium oxide, the improvement wherein the indium oxide contains more than 7 atomic per cent of tin, calculated with respect to the number of indium atoms, has a free-electron density between 10$^{21}$ and 3 times 10$^{21}$ per cm$^3$ and a plasma wavelength of less than 1.2 $\mu$m.

2. The filter as claimed in claim 1, wherein the indium oxide contains between 7 atomic percent and 20 atomic per cent of tin, calculated with respect to the number of indium atoms.

3. A method of manufacturing a light-transmitting, heat-radiation reflecting filter comprising coating a light-transmitting support with indium oxide doped with more than 7 atomic per cent of tin, calculated with respect to the number of indium atoms, heating the coated support in a gas containing an oxygen partial pressure of less than 10$^7$ atmosphere and at a temperature between 300°C and the softening temperature of the support, whereby a heat filter having a plasma wavelength of less than 1.2 $\mu$m and a free-electron density between 10$^{21}$ and 3 times 10$^{21}$ per cm$^3$ on the support is obtained.

4. The method as claimed in claim 3, wherein the gas contains CO, H$_2$ or CO and H$_2$ having a partial pressure of from 5 torr to 50 torr per component.

5. The method as claimed in claim 3, wherein the gas has an oxygen partial pressure between 10$^{-7}$ atmosphere and the equilibrium pressure of indium-oxide.

6. The method as claimed in claim 5, wherein the gas contains CO and CO$_2$ or H$_2$ and H$_2$O.

7. The method as claimed in claim 3 wherein the gas has a temperature between 380°C and 500°C.

8. An electric lamp provided with a filter as claimed in claim 1.

9. An electric lamp provided with a filter as claimed in claim 2.

10. The method as claimed in claim 4, wherein the gas has a temperature between 380°C and 500°C.

11. The method as claimed in claim 5, wherein the gas has a temperature between 380°C and 500°C.

* * * * *

UNITED STATES PATENT AND TRADEMARK OFFICE
CERTIFICATE OF CORRECTION

PATENT NO. : 3,949,259
DATED      : April 6, 1976
INVENTOR(S) : HEINER KOSTLIN and RUDIGER JOST It is certified that error appears in the above-identified patent and that said Letters Patent are hereby corrected as shown below:

Col. 1, line 20, "spectrum" second occurence should be

-- --;

line 35, "describied" should be --described--;

Col. 3, line 13, after "and" should be --an--;

IN THE CLAIMS

Claim 3, line 7, "$10^7$" should be --$10^{-7}$--.

Signed and Sealed this twenty-second Day of June 1976

[SEAL]

Attest:

RUTH C. MASON
*Attesting Officer*

C. MARSHALL DANN
*Commissioner of Patents and Trademarks*